(12) United States Patent
Petrucelli

(10) Patent No.: US 9,310,268 B2
(45) Date of Patent: Apr. 12, 2016

(54) LOW PROFILE PRESSURE SENSOR

(71) Applicant: Measurement Ltd., Grand Cayman (KY)

(72) Inventor: Steven Petrucelli, Cranbury, NJ (US)

(73) Assignee: Measurement Ltd., Grand Cayman (KY)

( * ) Notice: Subject to any disclaimer, the term of this patent is extended or adjusted under 35 U.S.C. 154(b) by 129 days.

(21) Appl. No.: 14/216,300

(22) Filed: Mar. 17, 2014

(65) Prior Publication Data

US 2014/0260649 A1 Sep. 18, 2014

Related U.S. Application Data

(60) Provisional application No. 61/788,403, filed on Mar. 15, 2013.

(51) Int. Cl.
| | |
|---|---|
| *G01L 9/04* | (2006.01) |
| *G01L 9/00* | (2006.01) |
| *G01L 19/00* | (2006.01) |
| *G01L 19/14* | (2006.01) |

(52) U.S. Cl.
CPC ............ *G01L 9/0055* (2013.01); *G01L 19/0038* (2013.01); *G01L 19/143* (2013.01); *G01L 19/147* (2013.01)

(58) Field of Classification Search
CPC ........................................................ G01L 9/04
USPC ............................................................ 73/726
See application file for complete search history.

(56) References Cited

U.S. PATENT DOCUMENTS

| | | | | |
|---|---|---|---|---|
| 5,119,066 | A * | 6/1992 | Ballyns | ............... B60C 23/0408 116/34 R |
| 6,255,728 | B1 | 7/2001 | Nasiri et al. | |
| 2003/0154795 | A1 | 8/2003 | Pitzer | |
| 2005/0150303 | A1* | 7/2005 | Maitland | ............... G01L 9/0051 73/754 |
| 2007/0245830 | A1* | 10/2007 | Thuruthumaly | .... G01L 19/0007 73/756 |
| 2013/0031984 | A1 | 2/2013 | Jones et al. | |

OTHER PUBLICATIONS

International Search Report dated Aug. 7, 2014 for related International Application No. PCT/US2014/030479.

* cited by examiner

*Primary Examiner* — Lisa Caputo
*Assistant Examiner* — Jamel Williams
(74) *Attorney, Agent, or Firm* — Howard IP Law Group, P.C.

(57) ABSTRACT

A pressure sensor 100 may comprise a nylon socket 200, an upper PCB 320, a lower PCB 340, and a hex housing 400. The nylon socket 200 may include co-molded electrical pin conductors 230a, 230b, 230c extending axially from electrical connectors 240a, 240b, 240c defined within a top end of the nylon socket 200 to a bottom end of the nylon socket 200. The upper PCB 320 may have contacts configured to contact the electrical pin conductors 230a, 230b, 230c. The lower PCB 340 may be electrically coupled to the upper PCB 320 and to strain gauges 355 coupled to a diaphragm 360. The hex housing 440 may have an interior axial port 430 extending from a bottom of said hex housing 400 to a counterbore 440 for holding the diaphragm 360, thereby exposing a first side of said diaphragm 360 to the fluid within the axial port 430.

20 Claims, 8 Drawing Sheets

LOW PROFILE PRESSURE SENSOR

CROSS-REFERENCE TO RELATED APPLICATIONS

This patent application claims priority to, and benefit of, under 35 U.S.C. 119(e), U.S. Provisional Patent Application Ser. No. 61/788,403, filed Mar. 15, 2013, the entirety of which is incorporated herein by reference for all purposes.

FIELD OF THE INVENTION

This invention relates generally to pressure sensors, and more particularly to a low profile pressure sensor for measuring fluid pressure.

BACKGROUND OF THE INVENTION

Known pressure sensors for measuring the pressure of fluid are generally complicated in construction, costly to produce, and physically large devices that are difficult to fit in the areas in which fluid pressure measurements are needed. A low profile pressure sensor that has a simplified construction that is easy to manufacture, which uses more cost-effective parts, and which is low profile for use in space-limited areas is desired.

SUMMARY OF THE INVENTION

A pressure sensor 100 may comprise a nylon socket 200, an upper PCB 320, a lower PCB 340, and a hex housing 400. The nylon socket 200 may include co-molded electrical pin conductors 230a, 230b, 230c extending axially from electrical connectors 240a, 240b, 240c defined within a top end of the nylon socket 200, said electrical pin conductors 230a, 230b, 230c extending axially out of a bottom end of the nylon socket 200. The upper PCB 320 may have contacts configured to contact ends of the electrical pin conductors 230a, 230b, 230c. The lower PCB 340 may be electrically coupled to the upper PCB 320, and said lower PCB 340 may also be electrically coupled to strain gauges 355 coupled to a diaphragm 360. An injection molded hex housing 400 may include a counterbore 440 for holding said diaphragm 360, the hex housing 440 having an interior axial port 430 extending from a bottom of said hex housing 400 to said counterbore 440, thereby exposing a first side of said diaphragm 360 to the fluid within the axial port 430. A housing 310 may extend between a bottom portion of the nylon socket 200 and a top portion of the hex housing 400, said housing 310 including one or both of the upper PCB 320 and lower PCB 340. The diaphragm 360 deforms in response to the fluid contacting it through the axial port 430, thereby changing a resistance of the strain gauges 355.

In an embodiment, the diaphragm 360 is of ceramic, and the hex housing 400 includes an upwardly extending integrally formed cylindrical wall 490 forming an inner perimeter of the diaphragm counterbore 440, the cylindrical wall 490 being crimpable to hold said ceramic diaphragm 360 in the diaphragm counterbore 440. In another embodiment, the diaphragm 360 is made from stainless steel and said diaphragm 360 is welded into the diaphragm counterbore 440. The pressure sensor may further comprise PCB spacer pins 330a, 330b, 330c, 330d for connecting the upper PCB 320 and lower PCB 340, wherein the upper PCB defines holes 322a, 322b, 322c, 322d for receiving a first end of the spacer pins and the lower PCB defines holes 342a, 342b, 342c, 342d for receiving a second end of the spacer pins. The pressure sensor may also further comprise a PCB spacer 360 adjacent to a bottom side of the lower PCB 340, and the hex housing 400 may further include a PCB counterbore 450 for holding the PCB spacer 360. In an embodiment, the nylon socket further includes a lower O-ring 220 within a lower recess 250 and an upper O-ring 210 within an upper recess 260. The lower PCB 340 may be electrically coupled to the upper PCB 320 with electrical conductors.

BRIEF DESCRIPTION OF THE DRAWINGS

For a detailed understanding of the present invention, reference should be made to the following drawings wherein.

DETAILED DESCRIPTION OF THE DRAWINGS

Figure 1:
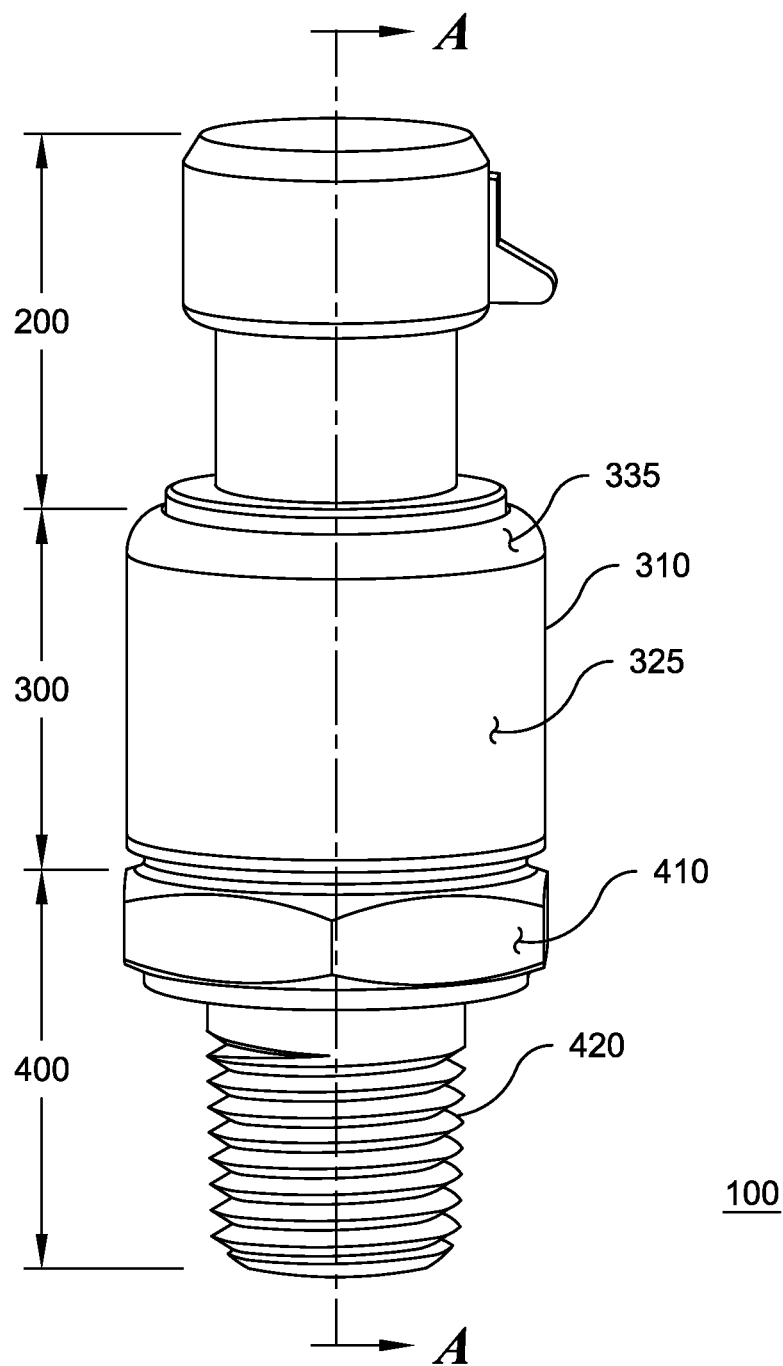
FIG. 1 is a front elevation view of a pressure sensor according to an embodiment of the present disclosure.

Referring to FIG. 1, a low profile pressure sensor 100 according to an embodiment of the present disclosure is shown. Generally, the pressure sensor 100 includes three primary parts: (1) an upper nylon socket 200 which may include an integral electrical connector for connection to an external data connector; (2) a hex housing 400 that contains a pressure sensing element such as a diaphragm with strain gauges, and a port for exposing the diaphragm to the liquid whose pressure is being measured, and (3) a middle section 300 which includes a housing that extends between a lower portion of the nylon socket 200 and an upper portion of the hex housing 400, and which provides a physical and electrical interface between the upper nylon socket 200 and the hex housing 400. The upper nylon socket 200 may include axial pin conductors (not shown) that form an electrical path between the integral electrical connector at the top of the nylon socket 200 and an upper printed circuit board (not shown) below the nylon socket that is within the housing 310 of the middle section 300. The axial pin conductors are configured to contact the upper printed circuit board, and the upper printed circuit board is electrically connected to the strain gauges on the diaphragm through a lower printed circuit board (not shown). The lower hex housing 400 may include an exterior threaded portion 410 and a hex portion 410 for installing the sensor within a suitable hole. In an embodiment, the overall length of the pressure sensor 100 may be 2.0-2.5 inches and the overall width of the pressure sensor may be nominally about one inch, providing a lower profile pressure sensor.

Figure 2:
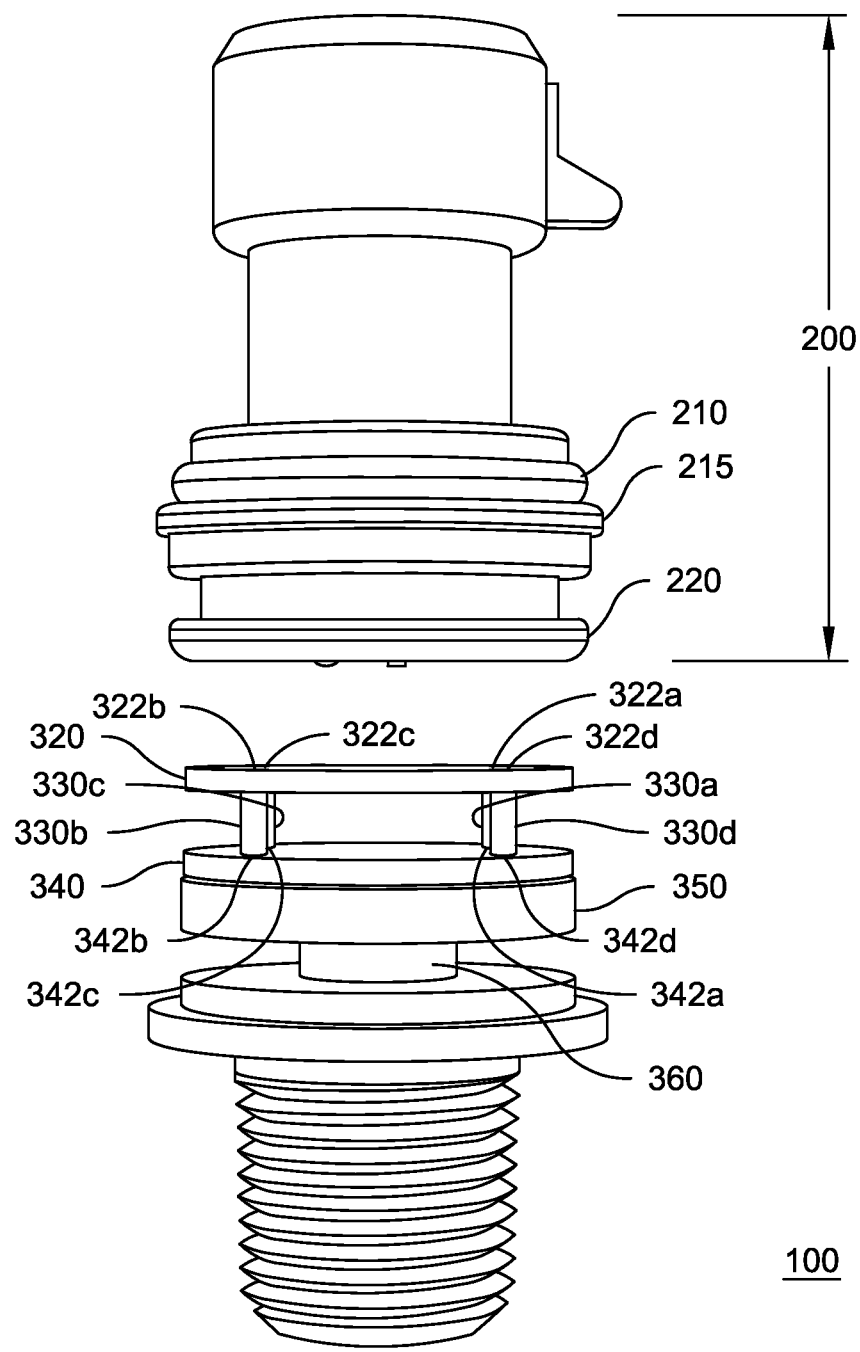
FIG. 2 is a front elevation view of the housing of a pressure sensor according to an embodiment of the present disclosure.

FIG. 2 depicts an embodiment of the pressure sensor 100 in which the middle section housing 310 and the hex portion 410 of the hex housing 400 are not shown for illustration purposes. The nylon socket 200 includes an upper O-ring 210 and a lower O-ring 220. The O-rings may be made of rubber or other suitable material. When the upper nylon socket 200 is fitted to the middle section 300, the O-rings help prevent penetration of the pressure sensor by liquid or air in the ambient environment in which the sensor is used. The housing 310 (not shown) of the middle section may include one or more of an upper output printed circuit board (upper PCB) 320, spacer pins 330a, 330b, 330c, and 330d, and lower bonding printed circuit board (lower PCB) 340. The printed circuit boards may be FR-4 grade glass-reinforced epoxy laminate printed circuit boards or other suitable material. In an embodiment, the upper lower printed circuit boards may comprise a single circuit board that performs the functions and has the connections of the upper and lower printed circuit boards. As shown on FIGS. 6 and 7, upper PCB 320 and lower PCB 340 may define a hole or aperture 322a for the upper PCB and 342a for the lower PCB for holding the spacer pin 330a. Upper PCB 320 may include additional holes or apertures 322b-322d and lower PCB 340 may include additional holes or apertures 342b-342d for holding the spacer pins 330b, 330c, and 330d, although these holes and spacer pins are not visible on the section views of FIGS. 6 and 7 (spacer pins 330b, 330c, and 330d are shown on FIG. 2). As will be understood, each of the holes or apertures may be sized to create a snug fit with each of the spacer pins. FIG. 2 also depicts a PCB spacer 350 which may be below the lower PCB 340, and which may fit into a spacer counterbore (shown in FIGS. 6 and 7) in the hex housing 400. The spacer may be made of a nylon such as PA66 or other suitable material. Diaphragm 360 is also shown, which may also fit into a diaphragm counterbore (shown in FIGS. 6 and 7) in hex housing 400. In an embodiment, diaphragm 360 may be stainless steel, such as 17-4 stainless, or ceramic, or it may be made of any suitable material whose deformation may be measured by gauges connected to the diaphragm. Materials such as stainless steel and ceramic that can withstand repeated deformation without tearing or otherwise puncturing are preferable. The type of material may also depend on the range of pressure values to be measured by the sensor. For example, a ceramic diaphragm may be more suitable for measuring pressure in lower pressure applications, such as 150 PSI or below. In another example, a stainless diaphragm may be suitable for measuring pressure in higher pressure applications, such as 150 PSI or above.

Figure 3:
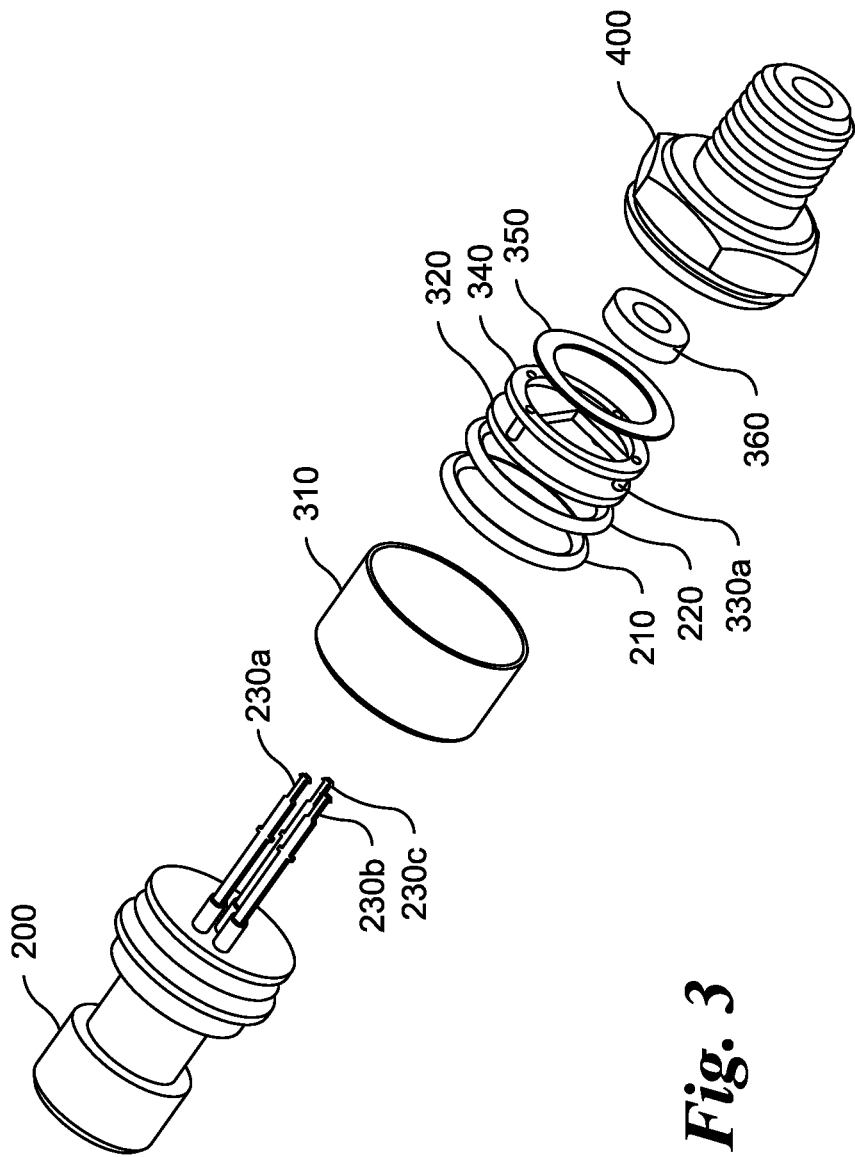
FIG. 3 is an exploded perspective view of a pressure sensor according to an embodiment of the present disclosure.

FIG. 3 depicts an exploded perspective view of the pressure sensor according to an embodiment of the disclosure. This view shows axial conductor pins 230a, 230b, and 230c extending from nylon socket 200. As will be understood, in the exploded view the pins are shown extending a greater distance out of nylon socket 200 than they actually extend, for purposes of illustration. As shown on FIGS. 6 and 7, the pins form an electrical connection between integral electrical connectors on the top of nylon socket 200 (shown in FIG. 5) and the upper PCB 320. In an embodiment, the nylon socket 200 may be made from a glass-filled nylon material that is co-molded to include conductor pins 230a, 230b, and 230c within the upper section when the nylon socket is formed. The nylon socket may have a nominal length of 0.8-1.2 inches. The nylon may be PA66 type nylon and in an embodiment may have 28-32% glass. In this co-molded embodiment, the labor of forming the upper section and then drilling holes for the conductor pins is avoided. Conductor pins 230a, 230b, and 230c may be made of a brass tin plated metal or other suitable material for carrying an electrical signal.

Housing 310 may be made of 304 stainless steel or other suitable material. As noted, when the housing is placed onto the nylon socket 200, the upper O-ring 210 and lower O-ring 220 help protect the pressure sensor from being penetrated by air or liquid in the ambient environment in which the sensor is used. The housing 310 is intermediate the nylon socket 200 and the hex housing 400. The housing 310 may, in an embodiment, include within it upper PCB 320 and lower PCB 340, and spacer pins 330a-d. In other embodiments, the housing 310 may include the upper PCB 320 and the lower PCB 340 may be partially or entirely within the hex housing 400. PCB spacer 350, diaphragm 360, and hex housing 400 are also shown.

The hex housing 400 may be made from a single or unitary piece of material such as stainless steel, which will be able to withstand exposure to the different types of fluids (perhaps some corrosive) to which the housing may be exposed. The hex housing 400 may be made by machining a piece of stainless steel. As will be understood, machining the steel to include the port, threads, hex portion, and counterbores requires a large amount of labor and skill. In another embodiment, hex housing 400 may be made by die cast or formed using sintered powdered metal. In an embodiment of the present disclosure, the hex housing 400 may be made using an injection process in which 3-16 stainless steel is injection molded to form the hex housing. A secondary CNC process may be used to touch up the injection molded 3-16 steel hex housing. The injection molded process is much less labor intensive than other methods such as machining the hex housing from a single piece of steel, and generally results in a more durable structure than die cast or sintering processes. The hex housing 400 may be attached or affixed to the housing 310 by suitable means after the pressure sensor 100 is assembled, which, in an embodiment, may include laser welding of a portion of the bottom of the housing 310 to a portion of the top of the hex housing 400.

Figure 4:
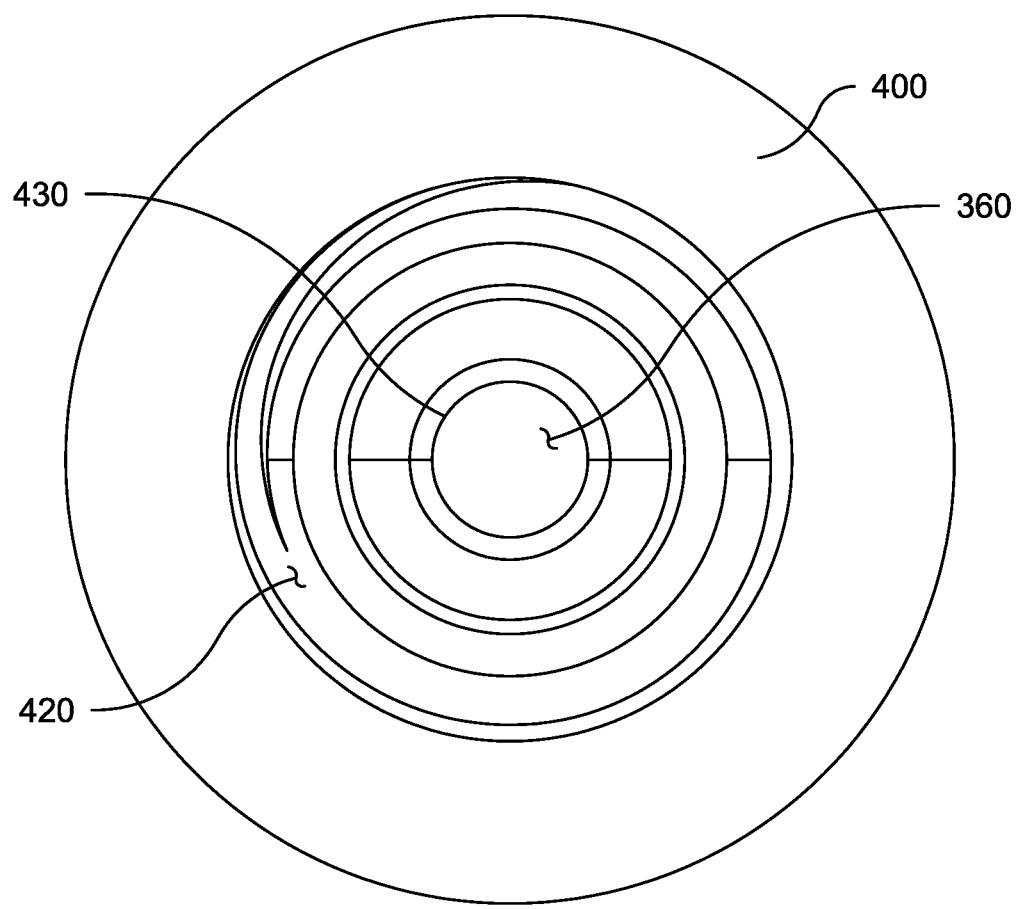
FIG. 4 is a bottom plan view of a pressure sensor according to an embodiment of the present disclosure.

FIG. 4 depicts a bottom view of the pressure sensor 100. The hex housing 400 of the pressure sensor is shown. The hex housing includes a threaded portion 420, and also a port 430. In an embodiment, the port may typically have a diameter of 0.2-0.25 inches. As shown on FIGS. 6 and 7, the port extends axially through the hex housing 400 from the bottom of the hex housing to the diaphragm counterbore 440, thereby creating a path for the fluid whose pressure is being measured to reach the diaphragm 360. As will be understood, it is the exposure of the diaphragm 360 through port 430 to the fluid that causes the diaphragm to deform or flex depending on the pressure of the fluid to which it is exposed.

Figure 5:
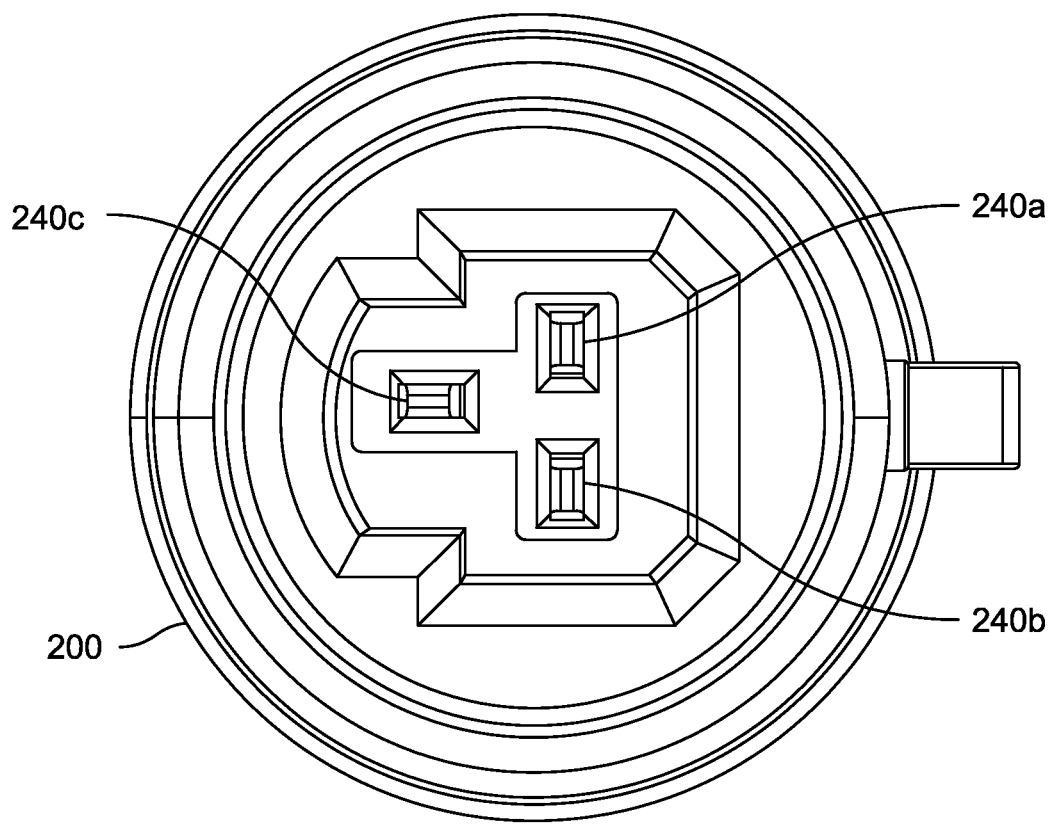
FIG. 5 is a top plan view of a pressure sensor according to an embodiment of the present disclosure.

FIG. 5 depicts a top view of the pressure sensor 100. The nylon socket 200 includes integral electrical connectors 240a, 240b, and 240c that align with electrical pins 230a, 230b, and 230c shown in FIG. 3. As will be understood, in an embodiment the electrical connectors 240a, 240b, and 240c may be integral female electrical connectors that are configured to connect with a male electrical connector with three conductors that is attached to it. In another embodiment, the electrical connectors 240a, 240b, and 240c may be male electrical connectors that are configured to connect with a female electrical connector with three conductors. When a suitable plug is connected, the electrical connectors provide an output that is indicative of the pressure sensed by the strain gauges on the diaphragm.

Figure 6:
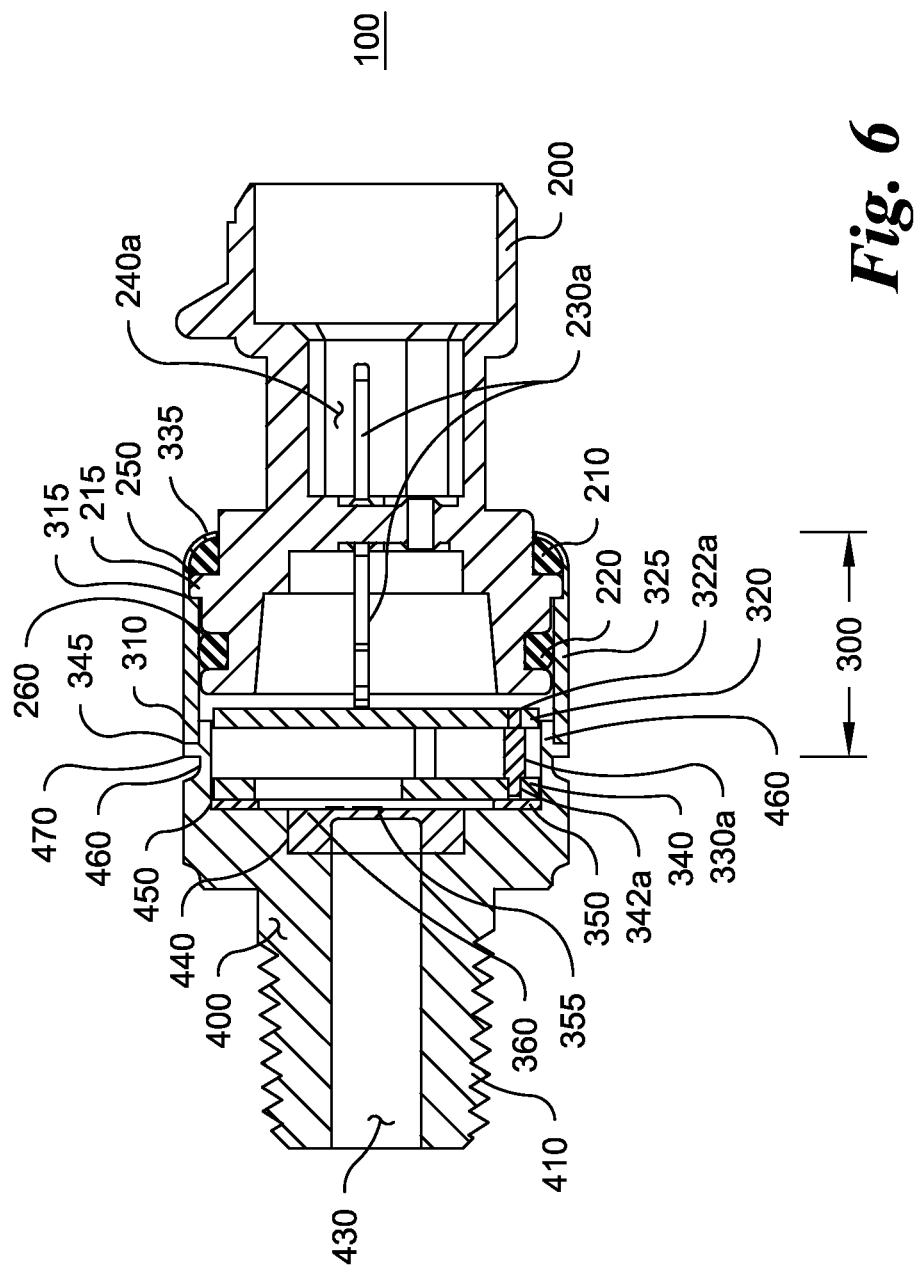
FIG. 6 is a partial cross-sectional view through line A-A of the pressure sensor of FIG. 1 according to an embodiment of the present disclosure in which the pressure sensor has a stainless steel diaphragm.

FIG. 6 depicts a section A-A of the pressure sensor 100, in an embodiment of the present disclosure in which the pressure sensor has a stainless steel diaphragm. The pressure sensor 100 includes nylon socket 200, middle section 300, and hex housing 400. Nylon socket 200 includes conductor pin 230a which extends from conductive pads on the upper PCB 320 to the integral electrical connector 240a formed in the nylon socket 200. Electrical connector 240a may be a cavity defined in the nylon socket 200 to receive an electrical plug that is configured to receive conductor pin 230a. As will be understood, nylon socket 200 also includes conductor pins 230b and 230c and associated electrical connectors 240b and 240c, which are not visible in the section of FIG. 6. The nylon socket 200 may include a lower recess or groove 260 for holding a lower O-ring 220 and an upper recess or groove 250 for holding upper O-ring 210 when the nylon socket 200 is attached or otherwise joined to the middle section 300. In an embodiment, the nylon socket 200 may include a circumferential flange 215 that engages an upper bearing surface 315 of the housing 310 when the nylon socket 200 is attached to the middle section 300. The middle section 300 includes housing 310 which may include a substantially cylindrical sidewall 325 with an inwardly curved upper lip 335 with is configured to engage or contact the upper O-Ring 210 when the nylon socket 200 is attached to the middle section 300. The bottom of the sidewall 325 may be a lower bearing surface 345 configured to sit on or contact a flange 470 of the hex housing 400 when the middle section 300 is connected to the hex housing 400. The inwardly curved upper lip 335 of the housing 310 may have a thinner width than the sidewall, such that the upper bearing surface 315 is formed which is configured to engage the circumferential flange 215 of the nylon socket 200. In the embodiment shown in FIG. 6, the upper PCB 320 is within housing 310. When the pressure sensor is assembled as shown in FIG. 6, the bottom of the nylon socket 200 is just above but not contacting upper PCB 320, except for the axial pin conductors of the nylon socket 200 that contact conductive pads on upper PCB 320.

FIG. 6 also depicts hex housing 400, which includes hex portion 410 and exterior threaded portion 420. Hex portion 410 and exterior threaded portion 420 allow the pressure sensor to be threaded into a hole with suitable threading to match the threaded portion. An interior port 430 may be defined within the hex housing 400, the inner port 430 being an aperture extending along the axis of the hex housing 400 from the bottom of the hex housing to the diaphragm 360. In an embodiment the diaphragm 360 may be a 17-4 stainless steel diaphragm, and strain gauges 355 may be MEMS (microelectromechanical) strain gauges that are glass bonded onto the upper side of the diaphragm 360. The hex housing 400 may include a diaphragm counterbore 440 which is configured to hold the diaphragm 360, which may then be welded (e.g., TIG welded) into the diaphragm counterbore 440 to prevent movement of the diaphragm. The hex housing 400 may also include a PCB counterbore 450 which is configured to hold the PCB spacer 350 and the lower PCB 340. Hex housing 400 may also include a circumferential upwardly extending wall 460, which has a circumference substantially similar to the inner circumference of the housing wall 325, so that the upwardly extending wall 460 may slide into the bottom of housing 310 when the pressure sensor is assembled. The upwardly extending wall 460 may include a circumferential flange 470 which is configured to contact the lower bearing surface 345 of the housing 310. A laser weld may be made where the flange 470 and lower bearing surface 345 of the housing 310 meet to attach the hex housing 400 to the middle section 300.

Lower PCB 340 is adjacent to and above the PCB spacer 350. Upper PCB 320 is above lower PCB 340, and spacer pin 330a between the upper PCB 320 and the lower PCB 340 may provide a physical and/or an electrical connection between the upper and lower PCBs. As shown, the upper PCB 320 and lower PCB 340 each have a hole 322a, 342a or aperture for receiving spacer pin 330a. Additional spacer pins 330b, 330c, and 330d, and their associated holes (322b, 322c, and 322d on the upper PCB and 342b, 342c, and 342d on the lower PCB) are not visible in the section view of FIG. 6. As noted, the axial pin conductors 230a, 230b, 230c of the nylon socket 200 make contact with conductive pads on upper PCB 320 when the pressure sensor 100 is assembled.

Figure 7:
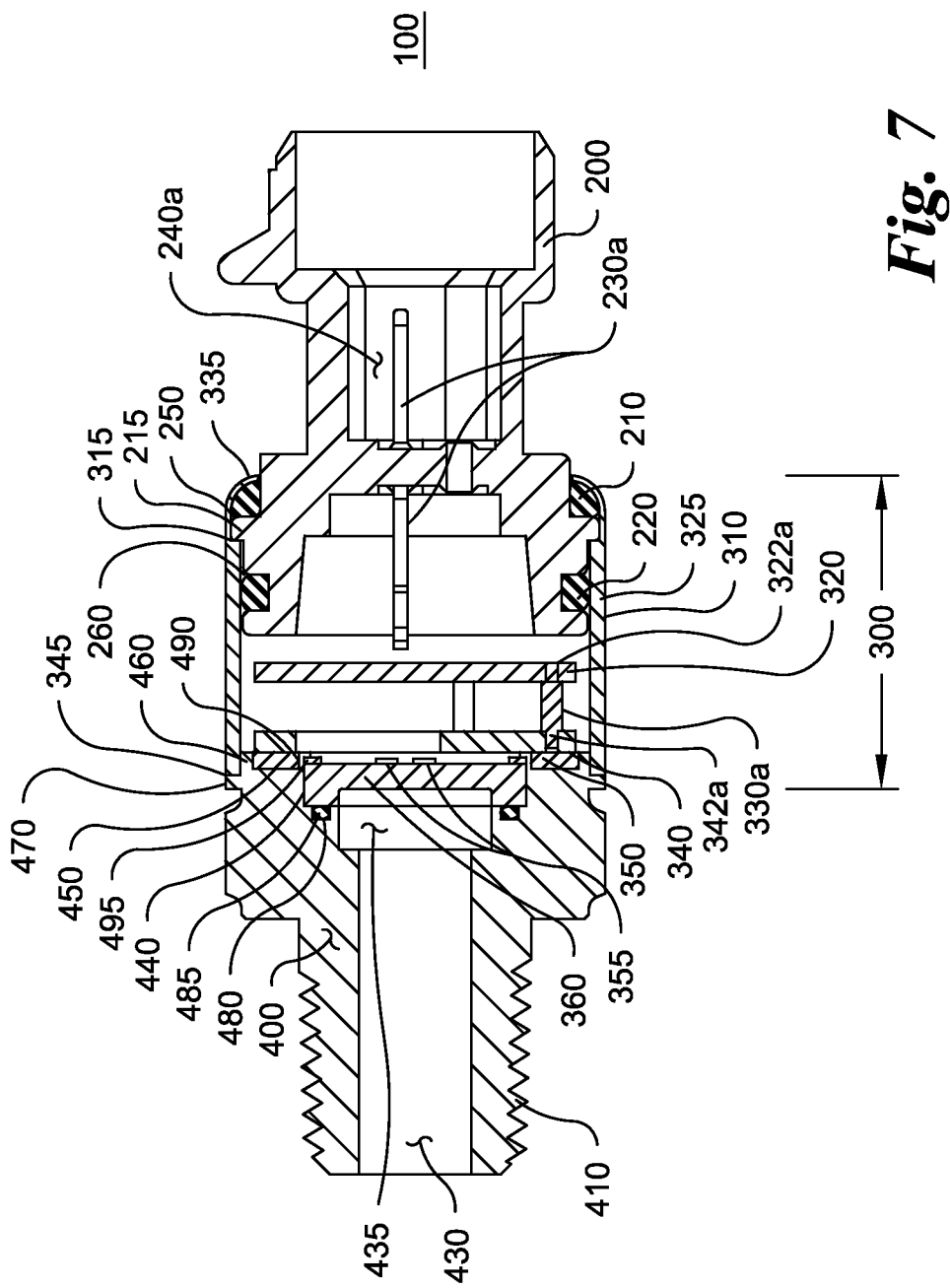
FIG. 7 is a partial cross-sectional view through line A-A of the pressure sensor of FIG. 1 according to an embodiment of the present disclosure in which the pressure sensor has a ceramic diaphragm.

FIG. 7 depicts a section A-A of the pressure sensor 100, in an embodiment of the present disclosure in which the pressure sensor has a ceramic diaphragm. The pressure sensor 100 of FIG. 7 is similar to the pressure sensor 100 of FIG. 6, except that the pressure sensor of FIG. 7 includes a diaphragm that is held in place without welding. In particular, a ceramic diaphragm may be used in the embodiment of FIG. 7, a ceramic diaphragm being suited for low pressure applications of 150 PSI or lower. The ceramic diaphragm 360 shown in FIG. 7 is undercut, meaning that its outer rim is thicker than its inner portion, which increases the durability of the diaphragm. The ceramic diaphragm is located within a diaphragm counterbore 440. In addition, the hex housing 400 includes a circumferential groove 480 in the diaphragm counterbore 440, the circumferential groove 480 being configured to hold a diaphragm O-ring 485. As will be understood, diaphragm O-ring 485 helps prevent fluid from interior port 430 from entering into the interior of middle section 300 of pressure sensor 100. The diaphragm 360 (ceramic or otherwise) may be configured to sit within the diaphragm counterbore 440 on top of O-ring 485. In an embodiment, the hex housing 400 may include a upwardly extending integrally formed cylindrical crimping wall 490 for holding the diaphragm in the counterbore 440. The cylindrical crimping wall 490 is injection molded as an integral part of the hex housing 400. A metal backing ring 495 is placed on top of the diaphragm 360 before the crimping wall is crimped or folded inward onto the metal backing ring. The metal backing ring 495 may have the same outer diameter as the diaphragm 360, and an inner diameter that is configured so that the ring is wide enough to prevent the cylindrical crimping wall 490 from contacting the diaphragm when the cylindrical crimping wall is folded or crimped. In FIG. 7, the cylindrical crimping wall 490 is shown after the diaphragm has been placed in the diaphragm counterbore 440 and the cylindrical crimping wall 490 has been crimped or folded over the metal backing ring 495 and the diaphragm 360. In the embodiment shown in FIG. 7, the cylindrical crimping wall 490 also helps define an inner perimeter of the PCB counterbore 450, which is configured to hold PCB spacer 350 and lower PCB 340. The hex housing 400 also includes interior port 430, which may also include a chamber 435 which is wider than the port 430, thereby exposing a greater area of the diaphragm 360 to the fluid whose pressure is being measured.

In the embodiment of FIG. 7, both the lower PCB 340 and the upper PCB 320 are within the housing 310. The lower PCB 340 sits on the PCB spacer 350. The nylon socket 200 and the middle section 300 of the pressure sensor of FIG. 7 are otherwise similar to their counterparts in the pressure sensor shown in FIG. 6. Specifically, nylon socket 200 includes conductor pin 230a which extends from the upper PCB 320 to the integral electrical connector 240a formed in the nylon socket 200. Electrical connector 240a may be a cavity defined in the nylon socket 200 to receive an electrical plug that is configured to receive conductor pin 230a. As will be understood, nylon socket 200 also includes conductor pins 230b and 230c and associated electrical connectors 240b and 240c, which are not visible in the section of FIG. 7. The nylon socket 200 may include grooves or recesses 250, 260 for holding one or more O-rings 210, 220 when the nylon socket 200 is attached or otherwise joined to the housing 310. In an embodiment, the nylon socket 200 may include a circumferential flange 215 that engages an upper bearing surface 315 of the housing 310 when the nylon socket 200 is attached to the middle section 300. The middle section 300 includes housing 310 which may include a substantially cylindrical sidewall 325 with an inwardly curved upper lip 335 which is configured to engage the upper O-Ring 210 when the nylon socket 200 is attached to the middle section 300. The bottom of the sidewall 325 may be a lower bearing surface 345 configured to sit on or contact a flange 470 of the hex housing 400 when the middle section 300 is connected to the hex housing 400. The inwardly curved upper lip 335 of the housing 310 may have a thinner width than the sidewall, such that the upper bearing surface 315 is formed which is configured to engage the circumferential flange 215 of the nylon socket 200.

FIG. 7 also depicts the middle section 300, which is substantially similar to the middle section of FIG. 6. The hex housing 400 may include a cylindrical upwardly extending wall 460, which has a circumference substantially similar to the inner circumference of the housing wall 325, so that the upwardly extending wall 460 may slide into the bottom of housing 310. The upwardly extending wall 460 may include a circumferential flange 470 which is configured to contact the lower bearing surface 345 of the housing 310. A laser weld may be made where the flange 470 and lower bearing surface 345 of the housing 310 meet to attach the hex housing 400 to the middle section 300. Spacer pin 330a is also shown between the upper PCB 320 and the lower PCB 340, which may provide a physical and/or an electrical connection between the upper and lower PCBs. As shown, the upper PCB 320 and lower PCB 340 each have a hole 322a, 342a or aperture for receiving spacer pin 330a. Additional spacer pins 330b, 330c, and 330d, and their associated holes (322b, 322c, and 322d on the upper PCB and 342b, 342c, and 342d on the lower PCB) are not visible in the section view of FIG. 7. Upper PCB 320 includes electrical contacts for connecting to axial conductor pins 230a, 230b, and 230c of the nylon socket 200 when the sensor is assembled. The electrical contacts may be conductive pads that are configured on the upper PCB 320 so they contact the conductor pins 230a, 230b, and 230c of the nylon socket 200. In an embodiment the pads may be spring loaded to better ensure contact between each pad and conductor pin.

In the embodiments of FIGS. 6 and 7, the electrical elements that are used to provide an electrical signal indicative of the pressure include the strain gauges 355, the lower PCB 340, the upper PCB 320, and the axial conductive pins 230a, 230b, 230c. As shown on FIGS. 6 and 7, strain gauges 355 may be affixed to the (upper) side of the diaphragm 360 that is not exposed to the fluid whose pressure is being measured. For example, the strain gauges 355 may be glass bonded to the diaphragm 360. The strain gauges 355 may be piezoresistive strain gauges whose resistance changes in response to deflection or deformation of the diaphragm, which affects an output signal provided by the strain gauges. The change in resistance can be used to determine the pressure being experienced by the diaphragm. The strain gauges 355 are electrically connected (e.g., by conductive wires) to the lower PCB 340, which may have circuitry or an IC chip that can receive the signal from the strain gauges, and which may be configured to provide one or more signals to the upper PCB 320, the signals being indicative of the pressure sensed by the diaphragm. As will be understood, the signals from the lower PCB 340 may be signals that are in a condition to be output via the upper PCB 320, or the upper PCB 320 may include circuitry or an IC for further processing of the signals before they are output. The lower PCB 340 may be electrically connected to the upper PCB 320 through electrical conductors or wire(s) or pin(s) connecting the upper PCB 320 and the lower PCB 340. In an embodiment, spacer pins 330a, 330b, 330c, and 330d may be used to electrically connect the upper PCB 320 and the lower PCB 340. Suitable traces on the upper and lower PCBs may be configured to use the spacer pins as electrical connections, and the spacer pins may be made of a brass tin plated metal or other suitable material. As noted, the upper PCB 320 may have circuitry or an IC chip that can receive the signals from the lower PCB 340 and further process those signals. In addition, upper PCB 320 may have circuitry or traces to otherwise provide output signals through conductive pads on the upper PCB 320 that are configured to contact axial conductor pins 230a, 230b, 230c when the sensor is assembled. In an embodiment the pads may be spring loaded to better ensure contact between each pad and conductor pin. The axial conductor pins 230a, 230b, 230c are connected to electrical connectors 240a, 240b, 240c of the nylon socket 200. A suitable plug may be connected to the electrical connectors to obtain pressure measurements.

Figure 8:
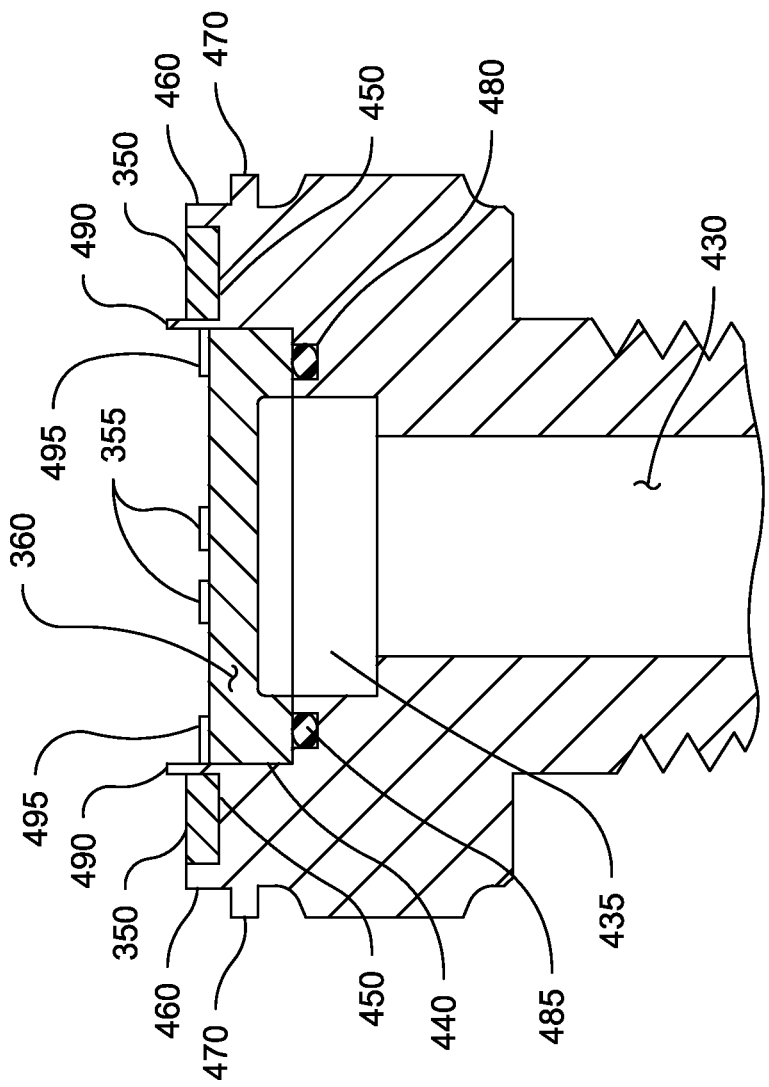
FIG. 8 depicts an enlargement of a section of the partial cross-sectional view of FIG. 7 depicting the diaphragm.

FIG. 8 depicts an enlargement of the hex housing 400 of the embodiment of the pressure sensor of FIG. 7 which has a ceramic diaphragm 360. FIG. 8 shows the hex housing with diaphragm 360 within the diaphragm counterbore 440, before the cylindrical crimping wall 490 is crimped or folded over the metal ring 495 on top of the diaphragm 360. As shown, the upward extending cylindrical crimping wall 490 also defines the inner diameter of the PCB spacer counterbore 450. As described above in relation to FIG. 7, after the cylindrical crimping wall 490 is folded onto the metal backing ring 495, the lower PCB 340 may be placed on the PCB spacer 350, and the remaining steps to assembly the pressure sensor may be performed.

A method for assembling a pressure sensor 100 having an nylon socket 200, a middle section 300, and hex housing 400 may comprise first assembling the hex housing. First an injection molded hex housing 400 is provided, obtained, or made with the features described herein. For an embodiment in which the diaphragm 360 is welded into the diaphragm counterbore 440, the diaphragm 360 is placed into the counterbore 440, and then the diaphragm is welded into place. Strain gauges 355 may then be glass bonded to the upper side of the diaphragm (the side facing away from the fluid), or the strain gauges may have been glass bonded to the diaphragm before the diaphragm was placed within the diaphragm counterbore. Then the PCB spacer 350 is placed within its PCB counterbore 450, the strain gauges 355 are electrically connected or coupled to the lower PCB 340, and then the lower PCB 340 is placed on top of PCB spacer 350. The PCB spacer pins 330a, 330b, 330c, 330d may then be placed into holes 342a, 342b, 342c, 342d of the lower PCB. Then, upper PCB 320 may be placed so that its holes 322a, 322b, 322c, 322d receive the upper ends of spacer pins 330a, 330b, 330c, 330d. In another embodiment, the upper PCB 320, spacer pins 330a, 330b, 330c, 330d, and lower PCB 340 may be preassembled before they are placed onto the PCB spacer 350, provided that the lower PCB 340 is configured so that it is capable of being connected to the strain gauges 355 even if it is preassembled with the upper PCB 320. The upper O-ring 210 and the lower O-ring 220 of the nylon socket 200 may then be placed on the upper section, and then the upper section may be placed on the upper PCB 320 so that conductive pins 230a, 230b, 230c of the nylon socket 200 contact suitable conductive pads on the upper PCB 320. Then, housing 310 may be slid down over the top of the nylon socket 200 so that the inwardly curved lip 335 is at the top of the housing 310, until the lower bearing surface 345 of the housing 310 contacts the flange 470 of the hex housing. Then the housing 310 and hex housing 400 may be connected together at the joint formed by the lower bearing surface 345 and the flange 470, by laser welding or other suitable means.

An embodiment in which the diaphragm 360 is captured or held within the diaphragm counterbore 440 by crimping differs slightly in assembly from the embodiment in which the diaphragm is welded into the counterbore. In the crimping embodiment, the hex housing includes circumferential groove 480 in the counterbore 440. A diaphragm O-ring 485 may be placed within the circumferential groove 480, then the diaphragm 360 is placed in the diaphragm counterbore 440 on top of the O-ring 485. The diaphragm 360 may have glass bonded strain gauges 355 bonded to its upper side, or the bonding may be done after the diaphragm 360 is placed within its counterbore 440. Then a metal backing ring 495 is placed on top of the diaphragm 360, and then the cylindrical crimping wall 490 is crimped down onto the metal backing ring 495 around the entire circumference of the diaphragm so that the diaphragm 360 is held within the diaphragm counterbore 440. In an embodiment, the width of the metal backing ring 495 is configured to that the folded portion of the cylindrical crimping wall 490 does not contact the diaphragm. Then the assembly continues similarly to the embodiment in which the diaphragm is welded, with the PCB spacer 350 being placed in its counterbore 450, a connection being made between the gauges 355 and the lower PCB 340, and the lower PCB 340 being placed on the PCB spacer 350. Then the PCB spacer pins 330a, 330b, 330c, 330d are installed within holes defined on the lower PCB 340, and then the upper PCB 320 is installed on the spacer pins within holes defined on the upper PCB 320.

In another embodiment, the upper PCB 320, spacer pins 330a, 330b, 330c, 330d, and lower PCB 340 may be preassembled before they are placed onto the PCB spacer 350, provided that the lower PCB 340 is configured so that it capable of being connected to the strain gauges 355 even if it is preassembled with the upper PCB 320. Upper and lower o-rings 210, 220 are placed on the nylon socket 200, and then the nylon socket 200 is placed on upper PCB 320 so that its axial conductor pins 230a, 230b, 230c contact conductive pads on the upper PCB 320. Finally, the housing 310, with the inwardly curved lip 335 facing up, is slid down the nylon socket 200 until the lower bearing surface 345 of the housing contacts the flange 470 of the hex housing 400. Then the housing 310 and hex housing 400 may be connected together at the joint formed by the lower bearing surface 345 and the flange 470, by laser welding or other suitable means.

This description of the preferred embodiments is intended to be read in connection with the accompanying drawings, which are to be considered part of the entire written description of this invention. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, such as "attached," "attaching," "mounted," and "mounting" are used interchangeably and refer to one structure or surface being secured to another structure or surface, unless expressly described otherwise.

It should be understood that the embodiments described herein are merely exemplary and that a person skilled in the art may make many variations and modifications to these embodiments utilizing functionally equivalent elements to those described herein. For example, the circularly-shaped diaphragms of the pressure sensor may be any other suitable shape if desired.

Any and all such variations or modifications as well as others which may become apparent to those skilled in the art, are intended to be included within the scope of the invention as defined by the appended claims.

What is claimed is:

1. A pressure sensor for measuring pressure of a fluid comprising:
    a thermoplastic socket including co-molded electrical pin conductors extending axially from electrical connectors defined within a top end of the thermoplastic socket, said electrical pin conductors extending axially out of a bottom end of the thermoplastic socket;
    an upper printed circuit board (PCB) having contacts configured to contact ends of the electrical pin conductors;
    a lower PCB electrically coupled to the upper PCB, said lower PCB also being electrically coupled to strain gauges coupled to a diaphragm;
    an injection molded first housing including a diaphragm counterbore for holding said diaphragm, the first housing having an interior axial port extending from a bottom of said first housing to said diaphragm counterbore, thereby exposing a first side of said diaphragm to the interior axial port; and
    a second housing extending between a bottom portion of the thermoplastic socket and a top portion of the first housing, said second housing including one or both of the upper PCB and lower PCB;
    wherein said diaphragm is configured to deform in response to fluid pressure contacting it through the interior axial port, thereby changing a response of the strain gauges.

2. The pressure sensor of claim 1, wherein the diaphragm is of ceramic, and wherein the first housing further includes an upwardly extending integrally formed cylindrical wall forming an inner perimeter of the diaphragm counterbore, the cylindrical wall being crimpable to hold said ceramic diaphragm in the diaphragm counterbore.

3. The pressure sensor of claim 1, wherein the diaphragm is made from stainless steel and said diaphragm is welded into the diaphragm counterbore.

4. The pressure sensor of claim 1, further comprising PCB spacer pins for connecting the upper PCB and lower PCB, wherein the upper PCB defines holes for receiving a first end of the spacer pins and the lower PCB defines holes for receiving a second end of the spacer pins.

5. The pressure sensor of claim 1, further comprising a PCB spacer adjacent to a bottom side of the lower PCB, and wherein the first housing further includes a PCB counterbore for holding the PCB spacer.

6. The pressure sensor of claim 1, wherein the thermoplastic socket further includes a lower O-ring within a lower recess and an upper O-ring within an upper recess.

7. The pressure sensor of claim 1, wherein the lower PCB is electrically coupled to the upper PCB with electrical conductors.

8. A pressure sensor for measuring pressure of a fluid comprising:
    a thermoplastic socket including co-molded electrical pin conductors extending axially from electrical connectors defined within a top end of the thermoplastic socket, said electrical pin conductors extending axially out of a bottom end of the thermoplastic socket;

at least one printed circuit board (PCB) for receiving an electrical signal from strain gauges coupled to a diaphragm and for outputting an output signal to electrical contact pads on the printed circuit board coupled to the electrical pin conductors;

an injection molded first housing including a diaphragm counterbore for holding said diaphragm, the first housing having an interior axial port extending from a bottom of said first housing to said diaphragm counterbore, thereby exposing a first side of said diaphragm to the interior axial port; and a second housing extending between a bottom portion of the thermoplastic socket and a top portion of the first housing, said second housing including at least a portion of the at least one printed circuit board;

wherein said diaphragm is configured to deform in response to fluid pressure contacting it through the interior axial port, thereby changing a response of the strain gauges.

9. The pressure sensor of claim 8, wherein the diaphragm is of ceramic, and wherein the first housing further includes an upwardly extending integrally formed cylindrical wall forming an inner perimeter of the diaphragm counterbore, the cylindrical wall being crimpable to hold said ceramic diaphragm in the diaphragm counterbore.

10. The pressure sensor of claim 8, wherein the diaphragm is made from stainless steel and said diaphragm is welded into the diaphragm counterbore.

11. The pressure sensor of claim 8, wherein the at least one printed circuit board comprises an upper PCB and a lower PCB, wherein the upper PCB includes the electrical contact pads coupled to the electrical pin conductors, the lower PCB is electrically coupled to the strain gauges, and the upper PCB is electrically coupled to the lower PCB to transmit signals from the strain gauges to the electrical pin conductors.

12. The pressure sensor of claim 11, wherein the lower PCB is electrically coupled to the upper PCB with electrical conductors.

13. The pressure sensor of claim 8, further comprising a PCB spacer adjacent to a bottom side of the lower PCB, and wherein the first housing further includes a PCB counterbore for holding the PCB spacer.

14. The pressure sensor of claim 8, wherein the thermoplastic socket further includes a lower O-ring within a lower recess and an upper O-ring within an upper recess.

15. A pressure sensor for measuring pressure of a fluid comprising:

a socket including electrical conductors extending axially from electrical connectors defined within a top end of the socket, said electrical conductors extending axially out of a bottom end of the socket;

at least one circuit board for receiving an electrical signal from gauges coupled to a diaphragm and for providing an output signal to electrical contacts on the circuit board coupled to the electrical conductors;

a lower housing containing the diaphragm within a top end of the lower housing perpendicular to a longitudinal axis of the pressure sensor, wherein the lower housing has an interior axial port extending from a bottom of said lower housing to said diaphragm, thereby exposing a first side of said diaphragm to the interior axial port; and a middle housing extending between a bottom portion of the socket and a top portion of the lower housing, said middle housing including at least a portion of the at least one circuit board;

wherein said diaphragm deforms in response to fluid contacting it through the interior axial port, thereby changing a resistance of the strain gauges.

16. The pressure sensor of claim 15, wherein the diaphragm is made of ceramic, and wherein the lower housing further includes a diaphragm counterbore for holding said diaphragm and an upwardly extending integrally formed cylindrical wall forming an inner perimeter of the diaphragm counterbore, the cylindrical wall being crimpable to hold said ceramic diaphragm in the diaphragm counterbore.

17. The pressure sensor of claim 15, wherein the lower housing further includes a diaphragm counterbore for holding said diaphragm and wherein the diaphragm is made from stainless steel and is welded into the diaphragm counterbore.

18. The pressure sensor of claim 15, wherein the at least one circuit board comprises an upper circuit board and a lower circuit board, wherein the upper circuit board includes the electrical contacts coupled to the electrical conductors, the lower circuit board is electrically coupled to the gauges, and the upper circuit board is electrically coupled to the lower circuit board to transmit signals from the strain gauges to the electrical conductors.

19. The pressure sensor of claim 18, wherein the lower circuit board is electrically coupled to the upper circuit board with electrical conductors.

20. The pressure sensor of claim 18, further comprising a circuit board spacer adjacent to a bottom side of the lower circuit board, and wherein the first housing further includes a circuit board counterbore for holding the circuit board spacer.

* * * * *